(12) United States Patent
Andreou et al.

(10) Patent No.: US 12,489,996 B2
(45) Date of Patent: Dec. 2, 2025

(54) FRONT-END ELECTRONIC CIRCUITRY FOR AN ELECTROMAGNETIC RADIATION SENSOR APPLICATION

(71) Applicant: ams International AG, Jona (CH)

(72) Inventors: Charalambos Andreou, Tann (CH); Fridolin Michel, Au (CH)

(73) Assignee: ams International AG, Jona (CH)

( * ) Notice: Subject to any disclaimer, the term of this patent is extended or adjusted under 35 U.S.C. 154(b) by 170 days.

(21) Appl. No.: 18/552,684

(22) PCT Filed: Apr. 6, 2022

(86) PCT No.: PCT/EP2022/059082
§ 371 (c)(1),
(2) Date: Sep. 27, 2023

(87) PCT Pub. No.: WO2022/214530
PCT Pub. Date: Oct. 13, 2022

(65) Prior Publication Data
US 2024/0073550 A1 Feb. 29, 2024

(30) Foreign Application Priority Data
Apr. 8, 2021 (DE) .................... 10 2021 108 710.4

(51) Int. Cl.
*G01T 1/24* (2006.01)
*G01T 1/36* (2006.01)
(Continued)

(52) U.S. Cl.
CPC ........... *H04N 25/709* (2023.01); *G01T 1/247* (2013.01); *G01T 1/366* (2013.01);
(Continued)

(58) Field of Classification Search
CPC ....... G01T 1/247; G01T 1/366; H04N 25/709; H04N 25/30; H04N 25/773; H04N 25/77; G01J 1/46; G01J 2001/442
See application file for complete search history.

(56) References Cited

U.S. PATENT DOCUMENTS 4,423,387 A 12/1983 Sempel
5,793,254 A 8/1998 O'Connor
(Continued)

FOREIGN PATENT DOCUMENTS

EP 1811657 A2 7/2007
EP 3780394 A1 2/2021
(Continued)

OTHER PUBLICATIONS

A High-Sensitivity Low-Power CMOS Sensor for a Future Neutron Personal Dosimeter Ying Zhang, Christine Hu-Guo, Daniel Husson, The-Duc Lé, Stéphane Higueret, and Yann (Year: 2012).*
(Continued)

*Primary Examiner* — Ahmed A Berhan
(74) *Attorney, Agent, or Firm* — Viering, Jentschura & Partner mbB

(57) ABSTRACT

A front-end electronic circuitry for an electromagnetic radiation sensor application comprises a charge sensitive amplifier stage with a first single-input operational transconductance amplifier, and a transistor being arranged in a first feedback path of the first single-input operational transconductance amplifier, and a signal shaper stage with a second single-input operational transconductance amplifier, and an active feedback circuit being arranged in a second feedback path of the second single-input operational transconductance amplifier. The front-end electronic circuitry further comprises a control circuit having a second transistor. The control circuit is configured to provide a control signal to
(Continued)

control the transistor of the first feedback path in dependence on a gate-source voltage of the second transistor.

15 Claims, 4 Drawing Sheets

(51) Int. Cl.
  *H04N 25/30* (2023.01)
  *H04N 25/709* (2023.01)
  *H04N 25/77* (2023.01)
  *H04N 25/773* (2023.01)
  *G01J 1/44* (2006.01)
  *G01J 1/46* (2006.01)

(52) U.S. Cl.
  CPC .......... *G01J 2001/442* (2013.01); *G01J 1/46* (2013.01); *H04N 25/30* (2023.01)

(56) References Cited

U.S. PATENT DOCUMENTS

| | | | |
|---|---|---|---|
| 6,998,913 | B2 | 2/2006 | Degeronimo |
| 8,384,038 | B2 * | 2/2013 | Guo .................. G01T 1/247 250/370.09 |
| 9,234,969 | B2 * | 1/2016 | Arques ................. G01T 7/005 |
| 9,829,377 | B2 * | 11/2017 | Steadman Booker .... G01T 1/17 |
| 2005/0275455 | A1 | 12/2005 | Degeronimo |
| 2010/0017246 | A1 | 1/2010 | Farrell et al. |
| 2010/0116999 | A1 | 5/2010 | Tuemer et al. |
| 2012/0242407 | A1 | 9/2012 | Yan |
| 2016/0299002 | A1 | 10/2016 | Steadman Booker et al. |
| 2020/0066715 | A1 | 2/2020 | Ichikawa et al. |

FOREIGN PATENT DOCUMENTS

| | | |
|---|---|---|
| JP | 2013503535 A | 1/2013 |
| JP | 2016540209 A | 12/2016 |
| WO | 2011023614 A1 | 3/2011 |

OTHER PUBLICATIONS

International Search Report issued for the corresponding PCT patent application No. PCT/EP2022/059082, dated Jul. 26, 2022, 5 pages (For informational purposes only).
German Search Report issued for the corresponding DE patent application No. DE 10 2021 108 710.4, dated Dec. 17, 2021, 7 pages (For informational purposes only).
Grybos, P. "Pole-Zero Cacellation Circuit for Charge Sensitive Amplifier with Pile-up Pulses Tracking System", 2006 IEEE Nuclear Science Symposium Conference Record; Oct. 29-Nov. 4, 2006; San Diego, CA, USA, IEEE Service Center, Piscataway, NJ, USA, Oct. 1, 2006, pp. 226-230, XP031083368.
Ying Z. "A High-Sensitivity 1-15 Low Power CMOS Sensor for a future Neutron Personal Dosimeter", IEEE Transactions on Nuclear Science, IEEE, USA, Aug. 1, 2012, vol. 59, Issue 4, pp. 1465-1471, XP011456487.
Yunbo Z. "Ultra-low power CMOS front end readouts ASIC for portable digital radiation detector", Tsinghua Science and Technology, Tsinghua University Press, Beijing, CN, Apr. 1, 2011, vol. 16, Issue 2, pp. 157-163, XP011376224.
Bochenek M. "Ibex: Versatile Readout ASIC with Spectral Imaging Capability and High Count Rate Capability", IEEE Transactions on Nuclear Science, Jun. 2018, vol. 65, Issue 6, pp. 1285-1291.
Grybos, P. "Pole-Zero Cancellation Circuit With Pulse Pile-Up Tracking System for Low Noise Charge-Sensitive Amplifiers", IEEE Transactions on Nuclear Science, Feb. 2008, vol. 55, Issue 1, pp. 583-590.
Gustavsson, M. et al.: "A High-Rate Energy-Resolving Photon-Counting ASIC for Spectral Computed Tomography", IEEE Transactions on Nuclear Science, vol. 59, Issue 1, Feb. 2012, pp. 30-39.
Kraft, E. et al.: "Counting and Integrating Readout for Direct Conversion X-ray Imaging: Concept, Realization and First Prototype Measurements", IEEE Transactions on Nuclear Science, Apr. 2007, vol. 54, Issue 2, pp. 383-390.
Llopart, X. et al.: "Medipix2, a 64k pixel read out chip with 55 mm square elements working in single photon counting mode", http://www.cern.ch/MEDIPIX, publication date unknown.
Japanese Notice of Reasons for Refusal of corresponding Japanese patent application 2023556865, dated Sep. 26, 2024, 8 pages (for informational purposes only).
Japanese Search Report by registered Organization of corresponding Japanese patent application 2023556865, dated Sep. 24, 2024, 23 pages (for informational purposes only).

* cited by examiner

FRONT-END ELECTRONIC CIRCUITRY FOR AN ELECTROMAGNETIC RADIATION SENSOR APPLICATION

RELATED APPLICATIONS

This is a US National Stage Application of International Application PCT/EP2022/059082, filed on 6 Apr. 2022, and claims priority under 35 U.S.C. § 119(a) and 35 U.S.C. § 365(b) from German Application 10 2021 108 710.4, filed on 8 Apr. 2021, the contents of which are incorporated herein by reference in their entirety.

TECHNICAL FIELD

The disclosure relates to a front-end electronic circuitry for an electromagnetic radiation sensor application, and particularly an X-ray imaging application or a photon-counting application, such as multi-energy spectral CT (Computed Tomography). The disclosure further relates to a sensor device for electromagnetic radiation, for example, a sensor device being embodied as a photon-counting sensor device using the front-end electronic circuitry.

BACKGROUND

Classical CT machines and X-ray imaging products use indirect conversion sensors. Indirect conversion sensors comprise a scintillator to convert X-rays to visible light which is captured by a photodetector or a photodiode to provide an electrical signal in response to the X-rays impinging on the material of the scintillator.

As opposed to conventional computed tomography using the indirect detection principle, photon-counting computed tomography resorts to direct conversion sensors. Direct conversion materials have now achieved a level of maturity and became popular, which has moved the focus of CT systems to the photon-counting approach. The photon-counting medical imaging has a number of advantages over the classical approach, such as better resolution and/or lower dose as well as spectral information.

A photon-counting imaging system requires a radically different approach on the front-end as compared to traditional imaging systems. This is derived from the fact that a high-speed and asynchronous continuous-timing processing of an input signal (current) is required. In particular, the photon-counting approach requires a front-end circuitry that receives a current input and, at the output, provides a voltage that is shaped in order to facilitate further processing by discriminators.

Due to the random nature of the incoming charge pulses, an asynchronous continuous-time front-end circuitry is required in order to convert the input charge pulses into voltage pulses at the output. The front-end topologies are usually single-stage or two-stage approaches. For small and fixed input capacitance, a single-stage architecture can be employed, which incorporates a shaping charge sensitive amplifier followed by discriminators and counters. For large and varying input capacitance, the two-stage architectural approach can be used.

FIG. 1 shows a photon-counting circuitry comprising a front-end electronic circuitry 10, having a two-stage topology, a photon detector 20, an energy discriminator 30 and a counter. When incident photons hit the direct conversion material, for example CdTe/CZT, of the photon detector 20, a transient current signal Iin is generated at the output of the photon detector 20. This current is proportional to the energy of the incident photon. The current Iin is then being processed by the front-end electronic circuitry 10 which comprises a charge sensitive amplifier stage 100 and a signal shaper stage 200 being coupled by a coupling network 400.

The charge sensitive amplifier stage 100 comprises an operational transconductance amplifier 110, a feedback capacitor 130 and a feedback resistor 140. The signal shaper stage 200 comprises an operational transconductance amplifier 210, a feedback capacitor 230 and a feedback resistor 240. It is common that the feedback resistors 140 and 240 are realized by a respective MOS (Metal-Oxide-Semiconductor) transistor which is biased in the linear-region. The baseline of the output of the charge sensitive amplifier stage 100 and the signal shaper stage 200 is defined by a reference voltage Vref connected to a respective (positive) input terminal of the operational transconductance amplifiers 110 and 210, which are configured as differential-input and single-ended output operational transconductance amplifiers.

The front-end electronic circuitry 10 will provide a shaped voltage Vout_shaper at the output of the signal shaper stage 200 which is proportional to the input current Iin and hence proportional to the energy of every single incident photon. The shaper output voltage Vout_shaper is then further processed by several discriminator circuits 30a, . . . , 30n and counter circuits 40a, . . . , 40n. The number of counts is proportional to the number of incident photons. Having multiple discriminator circuits 30a, . . . , 30n and counter circuits 40a, . . . , 40n will give information on the energy level of each incident photon. The counter outputs may be processed by a DSP (Digital-Signal-Processor), not shown in FIG. 1.

For medical imaging applications, a photon-counting front-end circuitry has the following important specifications, among others: low-power and low-noise, small silicon area, high count-rate which is related to the FWHM (Full-Width-Half-Maximum) of the shaped output, high-linearity and low ballistic deficit.

While the two-stage topology of a front-end electronic circuitry, as shown in FIG. 1, decouples the signal shaper stage 200 from an input capacitance at the input of the front-end electronic circuitry 10, because the charge sensitive amplifier 100 acts as a buffer, the two-stage front-end circuitry comes with higher noise and power penalty. When high-performance in terms of noise and FHWM is required, the front-end electronic circuitry has to burn large power that creates excessive thermal-effects that have negative influences on the performance stability of the system.

There is a need to provide a front-end electronic circuitry for an electromagnetic radiation sensor application that is capable of operating at very high count rates and having low power consumption without impacting other specifications, such as noise and speed. Furthermore, there is a desire to provide a sensor device for electromagnetic radiation that may be operated with high resolution and low power-consumption.

SUMMARY

A front-end electronic circuitry for an electromagnetic radiation sensor application that provides significant performance improvement in terms of power-consumption, noise and count-rate is specified in claim 1.

The front-end electronic circuitry for an electromagnetic radiation sensor application comprises an input node being configured to be coupled to a sensor sensitive to electromagnetic radiation to receive an input signal from the sensor, and an output node to provide an output signal. The front-end electronic circuitry comprises a charge sensitive amplifier stage and a signal shaper stage.

The charge sensitive amplifier stage comprises a first single-input operational transconductance amplifier having an input side being coupled to the input node and having an output side to provide a charge sensitive amplifier output signal. The charge sensitive amplifier stage further comprises a transistor being arranged in a first feedback path between the input side and the output side of the first single-input operational transconductance amplifier.

The signal shaper stage comprises a second single-input operational transconductance amplifier having an input side being coupled to the output side of the first single-input operational transconductance amplifier and having an output side being coupled to the output node. The signal shaper stage further comprises an active feedback circuit being arranged in a second feedback path between the input side and the output side of the second single-input operational transconductance amplifier.

The proposed two-stage approach allows a front-end electronic circuitry for an electromagnetic radiation sensor application to be realized even if a large and unpredictable input capacitance is effective at the input node of the front-end electronic circuitry. The large and unpredictable input capacitance may be caused by the package, especially when a sensor material and a signal-processing IC chip are coupled via an interposer.

The charge sensitive amplifier stage, which forms the first stage of the two-stage front-end electronic circuitry, allows the input signal to be buffered. The signal shaper stage, which forms the second stage of the two-stage front-end electronic circuitry, is thus decoupled from the input capacitance at the input node of the front-end electronic circuitry, and generates the output signal, for example a voltage pulse, in response to the input signal, for example an input current pulse.

The active feedback circuit acts as a resistive feedback for the second single-input operational transconductance amplifier of the signal shaper stage. The active feedback circuit enables to decouple the output side of the signal shaper stage from the output side of the charge sensitive amplifier stage.

The proposed two-stage architecture of the front-end electronic circuitry achieves significant reduction of the power consumption, without impacting any other specifications such as noise and speed, but rather improving them as well.

In particular, the proposed front-end architecture achieves lower power consumption for the same noise, or lower noise for the same power consumption.

The front-end electronic circuitry comprises a control circuit to provide a control signal to control the transistor in the first feedback path of the charge sensitive amplifier stage. The control circuit comprises a second transistor. The control circuit is configured to provide the control signal to control the transistor in the first feedback path of the charge sensitive amplifier stage in dependence on a gate-source voltage of the second transistor. The control circuit provides a bias technique to control the transistor in the first feedback path of the charge sensitive amplifier stage to guarantee constant feedback resistance of the transistor over PVT variations.

According to a possible embodiment of the front-end electronic circuitry, the input node may be configured to be coupled to the sensor being embodied as a photon detector of a photon-counting application. In this case, the electronic circuitry allows a two-stage photon-counting front-end to be realized.

According to a possible embodiment of the front-end electronic circuitry, the charge sensitive amplifier stage comprises a capacitor being arranged in parallel to the transistor of the charge sensitive amplifier stage between the input side and the output side of the first single-input operational transconductance amplifier. The signal shaper stage comprises a second capacitor being arranged in parallel to the active feedback circuit between the input side and the output side of the second single-input operational transconductance amplifier.

The capacitance of the capacitor of the charge sensitive amplifier stage is advantageously larger than the capacitance of the second capacitor of the signal shaper stage. Hence, if the input capacitance at the input node of the front-end electronic circuitry is large and/or unpredictable, the first stage/charge sensitive amplifier stage can handle the input capacitance with its relatively large capacitance of the capacitor of the charge sensitive amplifier stage and hence slow settling. The second stage/signal shaper stage of the front-end electronic circuitry performs the fast shaping of the output signal, for example a voltage pulse, with its relatively small capacitance of the second capacitor.

According to a possible embodiment, the front-end electronic circuitry comprises a coupling network being arranged between the output side of the first single-input operational transconductance amplifier and the input side of the second single-input operational transconductance amplifier. The coupling network comprises a parallel connection of a third transistor and a third capacitor. The control circuit is configured to provide the control signal to control the third transistor in dependence on a gate-source voltage of the second transistor of the control circuit.

The coupling network is configured as a pole/zero compensation network, wherein the third transistor can be embodied as a MOS resistor that is operated in linear region in parallel with a third capacitor.

According to a further embodiment of the front-end electronic circuitry, the first single-input operational transconductance amplifier has a single-input connection coupled to the input node, an input transistor and a first current source. The input transistor has a control node being coupled to the single-input connection to receive a first input control signal being dependent on the input signal to control the input transistor. The first current source is arranged in series with the input transistor.

The second single-input operational transconductance amplifier has a single-input connection being coupled to the output side of the first single-input operational transconductance amplifier. The second single-input operational transconductance amplifier comprises a second input transistor having a control node being coupled to the single-input connection of the second single-input operational transconductance amplifier to receive a second input control signal. The second input control signal is dependent on an output signal of the first single-input operational transconductance amplifier to control the second input transistor. Furthermore, the second single-input operational transconductance amplifier comprises a second current source being arranged in series with the second input transistor.

According to an advantageous embodiment of the front-end electronic circuitry, the second transistor is configured as a replica of the input transistor of the first single-input operational transconductance amplifier. The input and output of the charge sensitive amplifier stage is referred to the gate-source voltage of the input transistor of the first single-input operational transconductance amplifier which is not temperature-stable. The proposed bias technique of the control circuit allows to track the gate-source voltage of the input transistor by using the second transistor of the control circuit that is configured as a replica of the input transistor of the first single-input operational transconductance amplifier.

According to a possible embodiment of the front-end electronic circuitry, the control circuit comprises a first current path and a third current source being arranged in the first current path. The second transistor is arranged in the first current path in a diode connected configuration. The second transistor has a drain node being coupled to the third current source.

According to an advantageous embodiment of the front-end electronic circuitry, the control circuit comprises a fourth transistor being a replica of the third transistor of the coupling network. The control circuit is configured to generate the control signal to control the transistor in the feedback path of the charge sensitive amplifier stage and the third transistor of the coupling network in dependence on a gate-source voltage of the fourth transistor.

The configuration of the control circuit, wherein the second transistor is configured as a replica of the input transistor of the first single-input operational transconductance amplifier, and the fourth transistor is configured as a replica of the third transistor of the coupling network allows the respective gate-source voltage of both of the input transistor of the first single-input operational transconductance amplifier and the third transistor of the coupling network to be traced.

The control circuit thus provides a replica tracking which allows to operate the transistor in the first feedback path of the charge sensitive amplifier stage and the third transistor of the coupling network with a respective constant resistance over PVT variations of the gate-source voltage of the input transistor of the first single-input operational transconductance amplifier and the gate-source voltage of the third transistor of the coupling network. This ensures that, for example, the feedback resistance in the first feedback path is maintained within certain limits and thus the performance of the front-end electronic circuitry does not degrade due to PVT variations.

According to a possible embodiment of the front-end electronic circuitry, the control circuit comprises a second current path being coupled to the first current path. The fourth transistor is arranged in the second current path in a diode connected configuration. An output node of the control circuit is connected to a gate node of the fourth transistor.

According to a possible embodiment of the front-end electronic circuitry, the control circuit comprises a buffer circuit being arranged to couple the first current path to the second current path. A source node of the fourth transistor is connected to an output of the buffer circuit. The second transistor has a gate node that is connected to an input node of the buffer circuit.

According to another embodiment of the front-end electronic circuitry, the control circuit comprises a fourth current source being arranged in the third current path between the gate node of the fourth transistor and a reference potential.

The control circuit comprises a fifth current source being arranged in the second current path between a source node of the fourth transistor and a supply potential.

In this case the buffer circuit is replaced by a current source. In order to avoid any performance degradation, a matching between some elements of the front-end electronic circuitry can be advantageously provided. For example, the input transistor of the first single-input operational transconductance amplifier and the input transistor of the second single-input operational transconductance amplifier, and the second transistor of the control circuit are matched to each other, and/or the first current source and the second current source and the third current source are matched to each other, and/or a resistance provided by the transistor of the first feedback path and a resistance provided by the third transistor of the coupling network and a resistance provided by the fourth transistor of the control circuit are matched to each other, and/or a capacitance of the capacitor of the charge sensitive amplifier stage and a capacitance of the third capacitor of the coupling network are matched to each other.

According to a possible embodiment of the front-end electronic circuitry, the active feedback circuit comprises a transconductance amplifier having a first input node being coupled to the output side of the second single-input operational transconductance amplifier, and a second input node to receive a reference voltage, and an output node being coupled to the single-input connection of the second single-input operational transconductance amplifier.

The transconductance amplifier of the active feedback circuit allows to decouple the output side of the signal shaper stage from the output side of the charge sensitive amplifier stage. Moreover, the transconductance amplifier of the active feedback circuit allows to adjust the baseline of the shaper output at the reference voltage by applying the reference voltage to the second input node of the transconductance amplifier.

An embodiment of a sensor device for electromagnetic radiation that comprises the front-end electronic circuitry according to one of the embodiments described above is specified in claim 14. The sensor device comprises a sensor being sensitive to electromagnetic radiation to provide the input signal for the front-end electronic circuitry in dependence on electromagnetic radiation being received by the light sensor.

The sensor may be embodied as a photon detector sensor having a photon-sensitive area. The photon detector sensor is configured to generate the input signal for the front-end electronic circuitry, when a photon hits the photon-sensitive area.

Additional features and advantages of the front-end electronic circuitry are set forth in the detailed description that follows. It is to be understood that both the foregoing general description and the following detailed description are merely exemplary, and are intended to provide an overview or framework for understanding the nature and character of the claims.

BRIEF DESCRIPTION OF THE DRAWINGS

The accompanying drawings are included to provide further understanding, and are incorporated in, and constitute a part of, the specification. As such, the disclosure will be more fully understood from the following detailed description, taken in conjunction with the accompanying figures in which.

DETAILED DESCRIPTION

Figure 1:
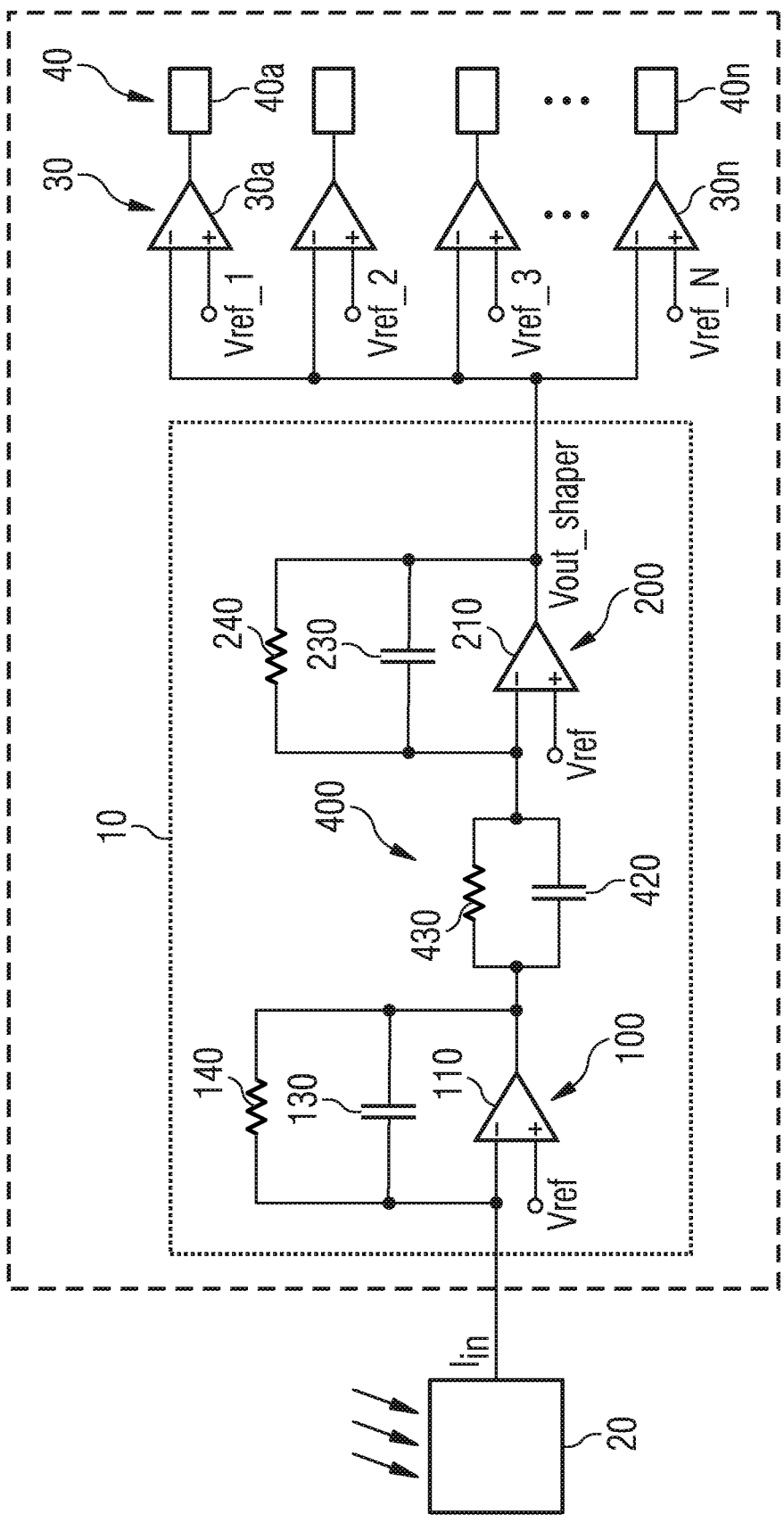
FIG. 1 shows an architectural diagram of a two-stage front-end electronic circuitry for a photon-counting application.
Figure 2:
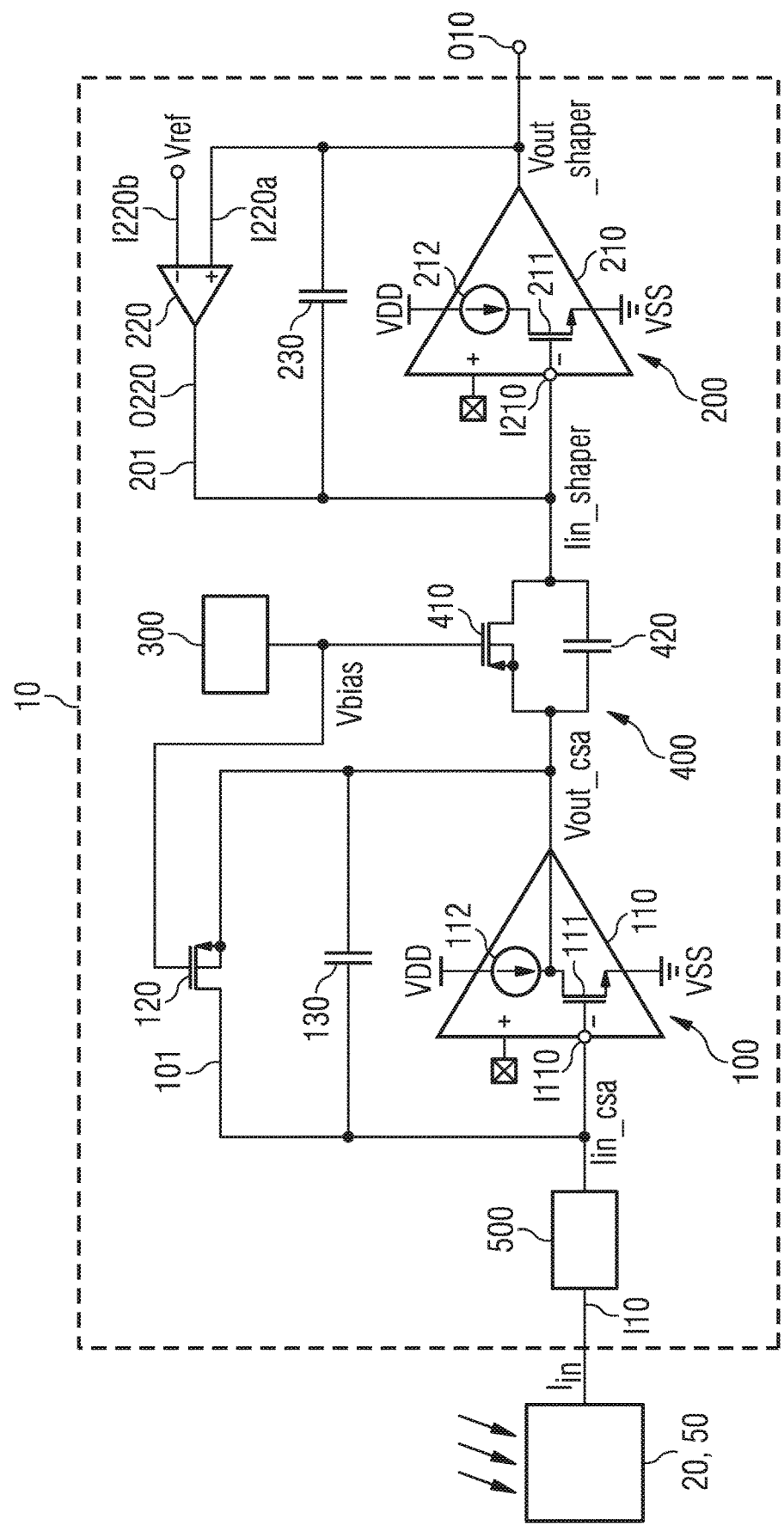
FIG. 2 shows an embodiment of a front-end electronic circuitry according to a two-stage approach using a respective single-input operational transconductance amplifier for a charge sensitive amplifier stage and a signal shaper stage.

FIG. 2 shows a two-stage approach of a front-end electronic circuitry 10 which may be used for an electromagnetic radiation sensor application, i.e. a sensor application being sensitive to light radiation or X-ray radiation, such as a photon-counting application. The front-end electronic circuitry 10 comprises an input node I10 that is configured to be coupled to a photon detector sensor 20 or a light sensor 50. The electronic circuitry 10 can basically be used as a front-end electronic circuitry for a photon-counting application, such as X-ray imaging or spectral CT (Computed Tomography).

The front-end electronic circuitry 10 comprises a charge sensitive amplifier stage 100 and a signal shaper stage 200. The signal shaper stage 200 provides an output signal Vout_shaper at an output node O10 of the front-end electronic circuitry 10, when an input current signal Iin is received at the input node I10.

The front-end electronic circuitry 10 is realized as a two-stage approach with the charge sensitive amplifier stage 100 forming the first stage and the signal shaper stage 200 forming the second stage. The two-stage architectural approach may be advantageously used for large and varying input capacitance at the input node I10. A large and unpredictable input capacitance occurs, for example, when an interposer is used in the assembly of a sensor device which provides a connection between a sensor material for light/X-ray conversion and a processing IC chip. The two-stage topology shown in FIG. 2 allows to decouple the signal shaper stage 200 from the input capacitance by the charge sensitive amplifier stage 100 which acts as a buffer between the input capacitance and the signal shaper stage 200.

In comparison to a one-stage approach, the two-stage topology comes with higher noise and power penalty because of the larger number of circuit components. According to the proposed approach, the front-end electronic circuitry 10 is configured as a single-input and single-output front-end. In particular, the charge sensitive amplifier stage 100 comprises a first single-input, single-output operational transconductance amplifier 110, and the signal shaper stage 200 comprises a second single-input, single-output operational transconductance amplifier 210.

The first single-input operational transconductance amplifier 110 has an input side being coupled to the input node I10 and has an output side to provide a charge sensitive amplifier output signal Vout_csa. An electrostatic discharge circuit 500 may be optionally arranged between the input node I10 and the input side of the operational transconductance amplifier 110. The second single-input operational transconductance amplifier 210 has an input side being coupled to the output side of the first single-input operational transconductance amplifier 110 and has an output side being coupled to the output node O10 of the front-end electronic circuitry.

Providing a respective single-input operational transconductance amplifier 110 for the charge sensitive amplifier stage 100 and for the signal shaper stage 200 instead of using a respective differential amplifier ideally reduces the noise power by a factor 4.

Referring to FIG. 2, the first single-input operational transconductance amplifier 110 has a single-input connection 1110 to apply an input control signal Iin_csa. The single-input connection 1110 is coupled to the input node I10. The second single-input operational transconductance amplifier 210 has a single-input connection 1210 to receive an input control signal Iin shaper. The single-input connection 1210 is coupled to the output side of the first single-input operational transconductance amplifier 110.

The charge sensitive amplifier stage 100 and the signal shaper stage 200 are shown in FIG. 2 in a simplified form as symbols, while only the respective single-input transistors and the DC current sources are shown. The first single-input operational transconductance amplifier 110 comprises an input transistor 111 having a control node that is coupled to the single-input connection 1110 to receive a first input control signal Iin_csa that is dependent on the input signal Iin to control the input transistor 111. The first single-input operational transconductance amplifier 110 further comprises a first current source 112 being arranged in series with the input transistor 111. According to a possible embodiment, the first current source 112 may have embedded RC filter on its gate in order to remove part of the high-frequency noise of the current source.

The second single-input operational transconductance amplifier 210 comprises a second input transistor 211 having a control node that is coupled to the single-input connection 1210 to receive a second input control signal Iin shaper that is dependent on an output signal Vout_csa of the first single-input operational transconductance amplifier 110 to control the second input transistor 211. The second single-input operational transconductance amplifier 210 further comprises a second current source 212 being arranged in series with a second input transistor 211.

As explained above, using a single-input operational transconductance amplifier 110 and 210 instead of a respective differential pair for the charge sensitive amplifier stage and the signal shaper stage provides a factor 4 power reduction for the same noise. The power reduction of the single-input operational tranconductance amplifiers 110 and 210 result from the fact that the tail current of a differential transistor pair in a differential transconductance amplifier is not split for a single-input operational transconductance amplifier, thus effectively doubling the bias current in the transistors.

Moreover, omitting the second branch, which is provided in a differential amplifier, removes one uncorrelated noise source splitting the noise by another factor 2. Alternatively, the power can be reduced by a factor of four for the same noise power.

The charge sensitive amplifier stage 100 comprises a transistor 120 being arranged in a first feedback path 101 between the input side and the output side of the first single-input operational transconductance amplifier 110. The charge sensitive amplifier stage 100 further comprises a capacitor 130 being arranged in parallel to the transistor 120 between the input side and the output side of the first single-input operational transconductance amplifier 110. The single-input, single-output operational transconductance amplifier 110 is provided in a negative feedback configuration. The negative feedback comprises the transistor 120 that acts as a MOS resistor being operated in linear region in parallel with the integrating capacitor 130.

The signal shaper stage 200 comprises an active feedback circuit 220 being arranged in a second feedback path 201 of the shaper stage 200 between the input side and the output side of the second single-input operational transconductance amplifier 210. The active feedback circuit 220 can be embodied as an amplifier. The signal shaper stage 200 further comprises a second capacitor 230 being arranged in parallel to the active feedback circuit 220 between the input side and the output side of the second single-input operational transconductance amplifier 210.

The single-input, single-output operational transconductance amplifier 210 is operated in a negative feedback configuration. The negative feedback of the signal shaper stage 200 comprises the active feedback circuit 220 in parallel with the integrating capacitor 230. The active feedback circuit 220 may be embodied as an active feedback amplifier which acts as a resistive feedback for the second single-input operational transconductance amplifier 210 of the signal shaper stage 200.

The active feedback circuit 220 may be embodied as a transconductance amplifier having a first input node I220a being coupled to the output side of the second single-input operational transconductance amplifier 210, and a second input node I220b to receive a reference voltage Vref. The active feedback circuit 220 has an output node O220 being coupled to the single-input connection I210 of the second single-input operational transconductance amplifier 210.

The active feedback circuit 220 having its input node I220a coupled to the output side of the second single-input operational transconductance amplifier 210 and its second input node I220b being arranged to receive the reference voltage Vref allows to adjust the baseline of the output of the signal shaper stage 200. In particular, the realization of a single-input operational transconductance amplifier 210, whose baseline output is at the reference voltage Vref, is becoming possible because of utilizing the active feedback circuit 220 which has its second input node I220b, for example, its negative terminal, connected at the reference voltage Vref.

Moreover, the active feedback circuit 220 decouples the output of the signal shaper stage 200 from the output side of the charge sensitive amplifier stage 100 which, in the case of the use of a single-input operational transconductance amplifier 110, is tied to the gate-source voltage of the input transistor 111. Hence, the output of the signal shaper stage 200 can be kept at a temperature-stable voltage Vref which is crucial for count rate stability.

The proposed approach of an active feedback circuit 220 being arranged in the second feedback path 201 of the shaper stage 200 improves the speed of the signal shaper stage as well as it drives the baseline of the shaper output at Vref by decoupling the output of the shaper 200 from the input of the shaper and therefore from the output of the charge sensitive amplifier 100. The active feedback is therefore crucial to obtain a stable shaper baseline at Vref independent of the gate source voltages of the single input transconductors in charge sensitive amplifier and the shaper Furthermore, non-linearity in the active feedback circuit 220 can be intentionally introduced to realize non-linear feedback resistance ($1/g_m$) which improves the FWHM by reducing the pulse width.

According to an advantageous embodiment, the capacitance of the capacitor 130 is larger than the capacitance of the capacitor 230. Assuming a large input capacitance at the input node I10, a large capacitance of the capacitor 130 allows to move the zero pole to lower frequencies as well as to compensate the pole. Hence, the first stage 100 "buffers" the input, and then the input capacitance of the second stage 200 is the internal one which is smaller, known and predictable and controllable. The small capacitance of the capacitor 230 allows for smaller time constant and therefore higher count rates.

Referring to FIG. 2, the front-end electronic circuitry 10 comprises a coupling network 400 being embodied as a pole/zero compensation network. The coupling network 400 is arranged between the output side of the first single-input operational transconductance amplifier 110 and the input side of the second single-input operational transconductance amplifier 210. The coupling network 400 comprises a parallel connection of a transistor 410 which acts as a MOS resistor operated in linear region, and a capacitor 420 being arranged in parallel with transistor 410.

Figure 3:
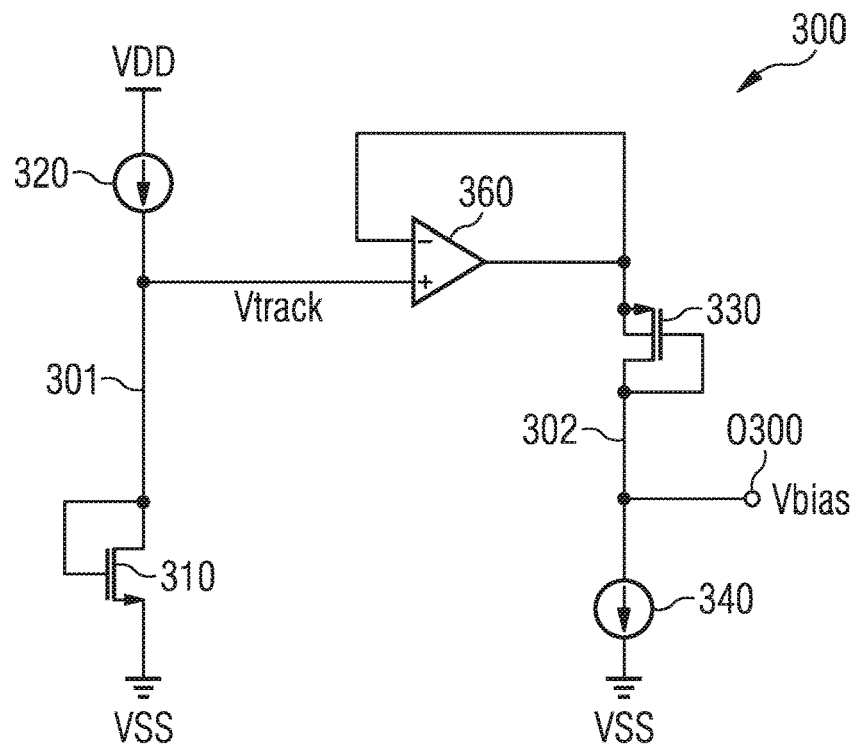
FIG. 3 shows an embodiment of a control circuit to control a transistor of a feedback path of the charge sensitive amplifier and a transistor of a coupling network of a front-end electronic circuitry for an electromagnetic radiation sensor application.
Figure 4:
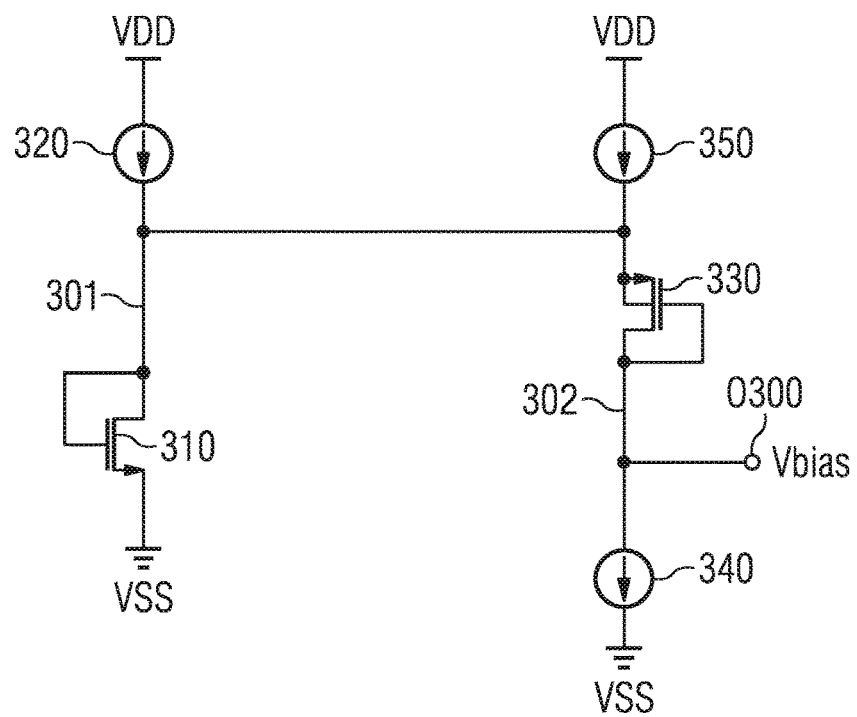
FIG. 4 shows another embodiment of a control circuit to control a transistor of a feedback path of a charge sensitive amplifier stage and a transistor of a coupling network of a front-end electronic circuitry for an electromagnetic radiation sensor application.

The front-end electronic circuitry 10 comprises a control circuit 300 to provide a control signal Vbias to control at least the transistor 120. FIGS. 3 and 4 show different embodiments for the control circuit 300. The control circuit 300 comprises a transistor 310 being configured as a replica of the input transistor 111 of the first single-input operational transconductance amplifier 100. The control circuit 300 is configured to provide the control signal Vbias in dependence on a gate-source voltage of the transistor 310. Moreover, the control circuit 300 may configured to provide the control signal Vbias to control the transistor 410 of the coupling network 400 in dependence on the gate-source voltage of the transistor 310.

Since in the single input approach, the output signal Vout_csa of the first single-input operational transconductance amplifier 110 will vary across PVT, it will therefore cause large variations of the MOS resistances of transistors 120 and 410. To solve this issue control circuit 300, that may be configured as a static control circuit, is provided which allows a replica biasing which tracks the PVT of input transistor 111 at the input of the first single-input operational transconductance amplifier 100.

Referring to FIGS. 3 and 4, the control circuit 300 comprises a transistor 330 that is configured as a replica of the transistor 410 of the coupling network 400. The control circuit 300 is configured to generate the control signal Vbias in dependence on the gate-source voltage of the transistor 310 and in dependence on the gate-source voltage of the transistor 330.

The input and output of the charge sensitive amplifier stage 100 is referred to the gate-source voltage of the input transistor 111 which is not temperature-stable. The control circuit 300 allows to track the output of the charge sensitive amplifier stage 100 and tune the resistance of transistor/MOS resistor 120 and the resistance of transistor/MOS resistor 410 accordingly across process, mismatch and during pulse events. This ensures that the feedback resistance is maintained within certain limits and thus the performance of the front-end electronic circuitry 10 does not degrade.

The control circuit 300 thus provides a replica tracking biasing by tracking the gate-source voltage of the input transistor 111 by using the transistor 310 being configured as a replica of the input transistor 111. Moreover, the control circuit 300 enables to track the gate-source voltage of the transistor 410 by using transistor 330 being configured as a replica of transistor 410. The size and bias current of the replica transistors 310 and 330 is a respective fraction of the input transistor 111 and the transistor 410. The tracking of the respective gate-source voltage of the input transistor 111 and transistor 410 allows the Vth variation as well as the current bias variations to be tracked. The bias technique introduced by the control circuit 300 guarantees to provide constant feedback MOS resistance of transistor 120 of the charge sensitive amplifier 100 and transistor 410 of the coupling network over PVT variations.

The input of the signal shaper stage 200 is also referred to the gate-source voltage of the input transistor 211 of the second single-input operational transconductance amplifier 210, and in the case that a MOS resistor would be used as feedback element in feedback path 201, the output would be referred to the gate-source voltage of the input transistor 211 as well. This would result in significant count rate instability.

According to the proposed approach for the signal shaper stage 200, the active feedback circuit 220 allows to decouple the output of the signal shaper stage 200 from PVT variations of the gate-source voltage of the input transistor 211 of the single-input operational transconductance amplifier 210.

Referring to the embodiments of the control circuit 300 shown in FIGS. 3 and 4, the control circuit 300 comprises a current path 301 and a current source 320 being arranged in the current path 301. The transistor 310 is arranged in the first current path 301 in a diode connected configuration. The transistor 310 has a gate node and a drain node connected to each other. A drain node of the transistor 310 is coupled to the current source 320, i.e. the drain node of transistor 310 is directly or indirectly connected to the current source 320. FIG. 3 shows a configuration, where transistor 310 is directly connected to current source 320. According to another possible embodiment, a cascode transistor may be provided between transistor 310 and current source 320.

The control circuit 300 comprises a current path 302 being coupled to the current path 301. The transistor 330 is arranged in the current path 302 in a diode connected configuration. The control circuit 300 comprises a current source 340 being arranged in the current path 302 between the transistor 330 and a reference potential VSS.

An output node O300 of the control circuit 300 to provide the control signal Vbias is connected to the gate node of transistor 330. The control signal Vbias provided at output node O300 of control circuit 300 is used to bias the control node/gate of transistor 110 of the charge sensitive amplifier stage 100 and transistor 410 of coupling network 400. The control circuit 300 thus uses a replica-tracking to provide the control signal Vbias in order to avoid degradation of the respective resistance of transistor/MOS resistor 110 of charge sensitive amplifier stage 100 and resistance of transistor 410/MOS resistor of coupling network 400.

Referring to the embodiment of the control circuit 300 shown in FIG. 3, the control circuit comprises a buffer circuit 360 being arranged to couple the current path 301 to the current path 302. A gate node of the second transistor 310 is connected to an input node of the buffer circuit 360. A source node of the transistor 330 is connected to an output of the buffer circuit 360.

The buffer circuit 360 enables that an output voltage Vtrack of current path 301 is buffered and used to bias transistor 330 in current path 302. The current through transistor 330 is defined by the current provided by current source 340. The current generated by current source 340 can be selected as being proportional to absolute temperature (PTAT) in order to cancel the temperature drift of the resistance of transistor/MOS resistor 110 in feedback path 101.

A second embodiment of control circuit 300 shown in FIG. 4 is similar to the embodiment of the control circuit 300 shown in FIG. 3, but it replaces the buffer amplifier 360 with an additional current source 350. The current source 350 is arranged in the current path 302 between a source node of transistor 330 and a supply potential VDD. The current sources 340 and 350 are designed such that both current sources provide the same current in current path 302 so that transistor 330 that is operated as a diode is not loaded.

In order to avoid any performance degradation, the architecture of the front-end electronic circuitry matching between some components can be advantageously provided. According to a possible embodiment, the input transistor 111 of the first single-input operational transconductance amplifier 110 and the input transistor 211 of the second single-input operational transconductance amplifier 210, and transistor 310 of control circuit 300 are matched to each other. Moreover, the first current source 112 of the first single-input operational transconductance amplifier 110 and the second current source 212 of the second single-input operational transconductance amplifier 210 and current source 320 of control circuit 300 can be matched to each other. Furthermore, a resistance provided by transistor/MOS resistor 120 and a resistance provided by transistor/MOS resistor 410 and a resistance provided by transistor/MOS resistor 330 can be matched to each other. In addition, a capacitance of capacitor 130 and a capacitance of capacitor 420 can be matched to each other.

Figure 5:
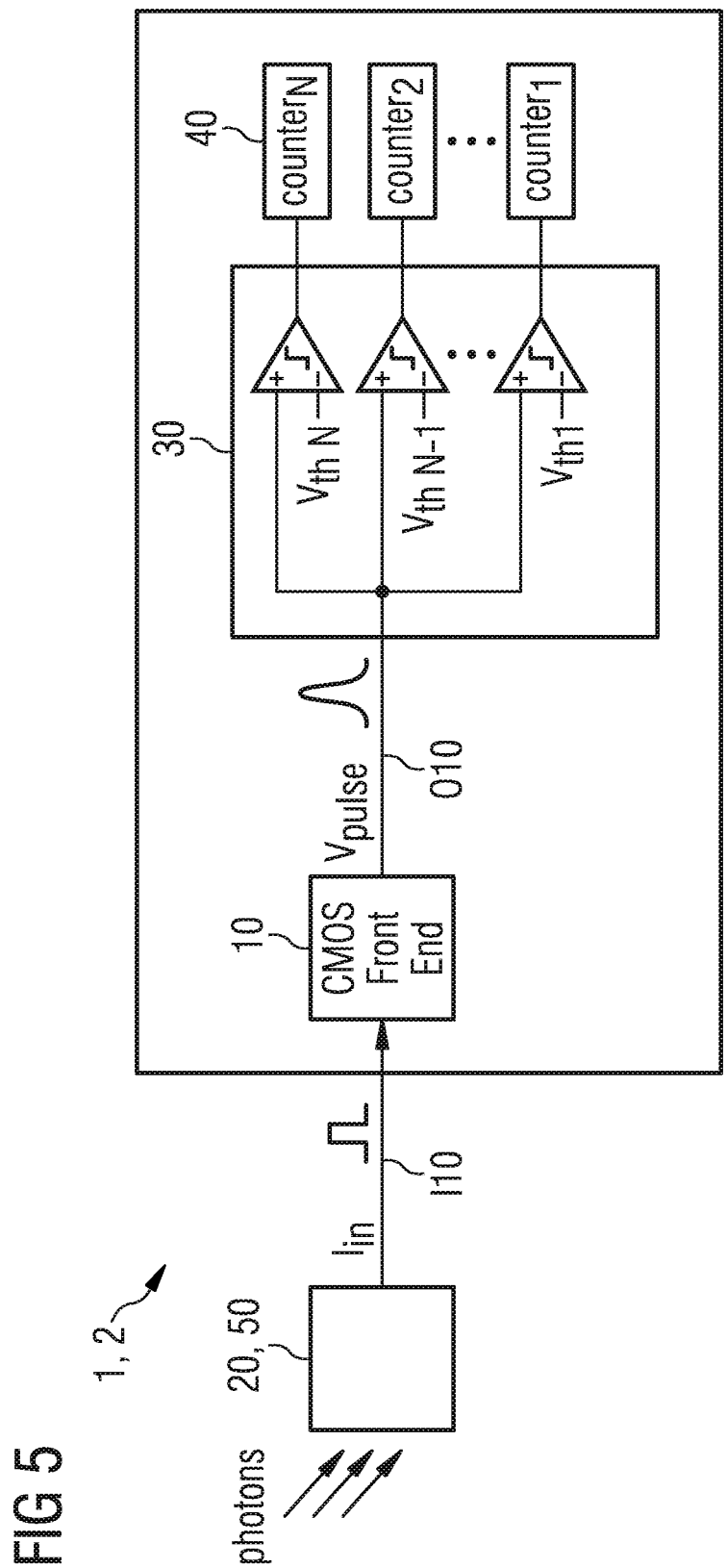
FIG. 5 shows an embodiment of a sensor device for electromagnetic radiation comprising a two-stage approach of a front-end electronic circuitry.

FIG. 5 illustrates a possible application for the front-end electronic circuitry 10 in a sensor device 1 for electromagnetic radiation, for example, a photon-counting sensor device 2, such as an X-ray or CT apparatus.

When used as a front-end in a sensor device 1 being sensitive to electromagnetic radiation, the electronic circuitry 10 may be connected with its input node I10 to a sensor 20, 50 being sensitive to electromagnetic radiation to provide the input signal Iin in dependence on electromagnetic radiation being received by the sensor 20, 50. The electromagnetic radiation may be light radiation or X-ray radiation. The sensor may be configured as a light sensor being sensitive to the light spectrum, or an X-ray sensor being sensitive to the X-ray spectrum. When used as a front-end in an X-ray application, for example in a photon-counting sensor device, the electronic circuitry 10 is coupled with its input node I10 to a photon detector sensor 20 having a photon-sensitive area.

The photon detector sensor 20 is configured to generate the input signal Iin, for example an input current pulse, when a photon hits the photon-sensitive area.

An energy discriminator 30 is connected to the output node O10 of the front-end electronic circuitry 10. The front-end electronic circuitry 10 is configured to generate the output signal Vout_shaper at the output node O10, when the input signal Iin is applied to the input node I10. An energy discriminator 30 is connected to the output node O10 of the front-end electronic circuitry and generates a digital signal in dependence on a level of the output signal Vout_shaper. The value of the counter 40 being coupled to the output of the discriminator 30 is then set in response to the level of energy of the output signal Vout_shaper.

The proposed approach of the front-end electronic circuitry is the application of power saving measures in the two-stage front-end architecture used for the sensor device for electromagnetic radiation, for example the photon-counting sensor device. The front-end electronic circuitry utilizes a respective single-input operational transconductance amplifier for the charge sensitive amplifier stage and the signal shaper stage with transistors/MOS resistors feedback which is enabled by introducing a replica tracking biasing provided by control circuit 300. The active feedback circuit/amplifier is provided in the feedback path of the signal shaper stage which replaces a shaper feedback resistor as well as tracking the reference voltage Vref in order to adjust the baseline of the output of the signal shaper stage. The combination of these measures in the scope of the overall architecture improves the performance of the front-end circuitry, and thus also the performance of apparatuses comprising the front-end circuitry, significantly without compromising count rate stability.

The embodiments of the front-end electronic circuitry disclosed herein have been discussed for the purpose of familiarizing the reader with novel aspects of the design of the front-end circuitry. Although preferred embodiments have been shown and described, many changes, modifications, equivalents and substitutions of the disclosed concepts may be made by one having skill in the art without unnecessarily departing from the scope of the claims.

In particular, the design of the front-end electronic circuitry is not limited to the disclosed embodiments, and gives examples of many alternatives as possible for the features included in the embodiments discussed. However, it is intended that any modifications, equivalents and substitutions of the disclosed concepts be included within the scope of the claims which are appended hereto.

Features recited in separate dependent claims may be advantageously combined. Moreover, reference signs used in the claims are not limited to be construed as limiting the scope of the claims.

Furthermore, as used herein, the term "comprising" does not exclude other elements. In addition, as used herein, the article "a" is intended to include one or more than one component or element, and is not limited to be construed as meaning only one.

LIST OF REFERENCE SIGNS

1 sensor device for electromagnetic radiation
2 photon-counting sensor device
10 front-end electronic circuitry
20 photon detector sensor
30 energy discriminator
40 counter circuit
50 light sensor
100 charge sensitive amplifier stage
110 single-input operational transconductance amplifier
120 transistor
130 capacitor
200 signal shaper stage
210 single-input operational transconductance amplifier
220 active feedback circuit
230 capacitor
300 control circuit
310,330 transistor
320,340,350 current source
360 buffer circuit
400 coupling network
410 transistor
420 capacitor
500 electrostatic discharge circuit
111,211 input transistor
112,212 current source

What is claimed is:

1. A front-end electronic circuitry for an electromagnetic radiation sensor application, comprising:
    an input node being configured to be coupled to a sensor sensitive to electromagnetic radiation to receive an input signal from the sensor,
    an output node to provide an output signal,
    a charge sensitive amplifier stage comprising a first single-input operational transconductance amplifier having an input side being coupled to the input node and having an output side to provide a charge sensitive amplifier output signal, and a transistor being arranged in a first feedback path between the input side and the output side of the first single-input operational transconductance amplifier,
    a signal shaper stage comprising a second single-input operational transconductance amplifier having an input side being coupled to the output side of the first single-input operational transconductance amplifier and having an output side being coupled to the output node, and an active feedback circuit being arranged in a second feedback path between the input side and the output side of the second single-input operational transconductance amplifier,
    a control circuit comprising a second transistor, wherein the control circuit is configured to provide a control signal to control the transistor in dependence on a gate-source voltage of the second transistor.

2. The front-end electronic circuitry of claim 1, wherein the input node is configured to be coupled the sensor being embodied as a photon detector of a photon counting application.

3. The front-end electronic circuitry of claim 1,
    wherein the charge sensitive amplifier stage comprises a capacitor being arranged in parallel to the transistor between the input side and the output side of the first single-input operational transconductance amplifier,
    wherein the signal shaper stage comprises a second capacitor being arranged in parallel to the active feedback circuit between the input side and the output side of the second single-input operational transconductance amplifier.

4. The front-end electronic circuitry of claim 3, comprising:
    a coupling network being arranged between the output side of the first single-input operational transconductance amplifier and the input side of the second single-input operational transconductance amplifier,
    wherein the coupling network comprises a parallel connection of a third transistor and a third capacitor,
    wherein the control circuit is configured to provide the control signal to control the third transistor in dependence on a gate-source voltage of the second transistor.

5. The front-end electronic circuitry of claim 4,
    wherein the first single-input operational transconductance amplifier has a single-input connection being coupled to the input node, an input transistor having a control node being coupled to the single-input connection to receive a first input control signal being dependent on the input signal to control the input transistor, and a first current source being arranged in series with the input transistor,
    wherein the second single-input operational transconductance amplifier has a single-input connection being coupled to the output side of the first single-input operational transconductance amplifier, a second input transistor having a control node being coupled to the single-input connection to receive a second input control signal being dependent on an output signal of the first single-input operational transconductance amplifier to control the second input transistor, and a second current source being arranged in series with the second input transistor.

6. The front-end electronic circuitry of claim 5, wherein the second transistor is configured as a replica of the input transistor of the first single-input operational transconductance amplifier.

7. The front-end electronic circuitry of claim 6,
wherein the control circuit comprises a first current path and a third current source being arranged in the first current path,
wherein the second transistor is arranged in the first current path in a diode connected configuration,
wherein the second transistor has a drain node being coupled to the third current source.

8. The front-end electronic circuitry of claim 7,
wherein the control circuit comprises a fourth transistor being configured as a replica of the third transistor,
wherein the control circuit is configured to generate the control signal in dependence of a gate-source voltage of the fourth transistor.

9. The front-end electronic circuitry of claim 8,
wherein the control circuit comprises a second current path being coupled to the first current path,
wherein the fourth transistor is arranged in the second current path in a diode connected configuration,
wherein an output node of the control circuit is connected to a gate node of the fourth transistor,
wherein the control circuit comprises a fourth current source being arranged in the second current path between the fourth transistor and a reference potential.

10. The front-end electronic circuitry of claim 9,
wherein the control circuit comprises a buffer circuit being arranged to couple the first current path to the second current path,
wherein a source node of the fourth transistor is connected to an output of the buffer circuit,
wherein the second transistor has a gate node that is connected to an input node of the buffer circuit.

11. The front-end electronic circuitry of claim 9, wherein the control circuit comprises a fifth current source being arranged in the second current path between a source node of the fourth transistor and a supply potential.

12. The front-end electronic circuitry of claim 5, wherein the active feedback circuit comprises a transconductance amplifier having a first input node being coupled to the output side of the second single-input operational transconductance amplifier, and a second input node to receive a reference voltage, and an output node being coupled to the single-input connection of the second single-input operational transconductance amplifier.

13. The front-end electronic circuitry of claim 8,
wherein the input transistor of the first single-input operational transconductance amplifier and the input transistor of the second single-input operational transconductance amplifier, and the second transistor of the control circuit are matched to each other, and/or
wherein the first current source and the second current source and the third current source are matched to each other, and/or
wherein a resistance provided by the transistor and a resistance provided by the third transistor and a resistance provided by the fourth transistor are matched to each other, and/or
wherein a capacitance of the capacitor and a capacitance of the third capacitor are matched to each other.

14. A sensor device for electromagnetic radiation, comprising:
a front-end electronic circuitry according to claim 1,
a sensor being sensitive to electromagnetic radiation to provide the input signal for the front-end electronic circuitry in dependence on electromagnetic radiation being received by the sensor.

15. The sensor device of claim 14,
wherein the sensor is embodied as a photon detector sensor having a photon sensitive area, the photon detector sensor being configured to generate the input signal for the front-end electronic circuitry, when a photon hits the photon sensitive area.

* * * * *